(12) United States Patent
Li et al.

(10) Patent No.: US 7,555,598 B2
(45) Date of Patent: *Jun. 30, 2009

(54) RAID SYSTEMS AND SETUP METHODS THEREOF THAT INTEGRATE SEVERAL RAID 0 ARCHITECTURES

(75) Inventors: Yong Li, Taipei (TW); Qing-Chao Luo, Taipei (TW)

(73) Assignee: Via Technologies, Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/420,096

(22) Filed: May 24, 2006

(65) Prior Publication Data

US 2007/0136526 A1 Jun. 14, 2007

(30) Foreign Application Priority Data

Dec. 8, 2005 (TW) .............................. 94143355 A (51) Int. Cl.
*G06F 12/00* (2006.01)

(52) U.S. Cl. ...................... 711/114; 711/162; 711/154; 711/171

(58) Field of Classification Search ................. 711/162, 711/154, 171, 114
See application file for complete search history.

(56) References Cited

U.S. PATENT DOCUMENTS

| | | | |
|---|---|---|---|
| 6,079,029 A | * | 6/2000 | Iwatani et al. .................. 714/6 |
| 6,807,649 B1 | | 10/2004 | Murthy |
| 2003/0105923 A1 | | 6/2003 | Bak et al. |
| 2003/0115412 A1 | | 6/2003 | Franklin et al. |

FOREIGN PATENT DOCUMENTS

| | | |
|---|---|---|
| CN | 1553345 | 12/2004 |
| JP | 11007359 | 1/1999 |

OTHER PUBLICATIONS

TW Office Action mailed Sep. 19, 2008.

* cited by examiner

*Primary Examiner*—Hyung S Sough
*Assistant Examiner*—Mardochee Chery
(74) *Attorney, Agent, or Firm*—Thomas, Kayden, Horstemeyer & Risley (57) ABSTRACT

RAID systems and setup methods thereof are provided. At least a first group of disks is selected to create a RAID 0 architecture. A second group of disks is further selected to create the RAID 0 architecture. The RAID 0 architectures are concatenated. The second group is within the first group, and the disks of the second group are the disks having remnant disk capacity after the RAID 0 architecture of the first group is created. The RAID 0 architectures corresponding to the first and second group are created respectively based on the disk having minimum disk capacity size among the disks of the first and second group.

14 Claims, 7 Drawing Sheets

RAID SYSTEMS AND SETUP METHODS THEREOF THAT INTEGRATE SEVERAL RAID 0 ARCHITECTURES

CROSS-REFERENCE TO RELATED APPLICATION

This application is related to copending application entitled "RAID systems and setup methods thereof", U.S. Application no.: Ser. No. 11/420,084, filed on May 24, 2006.

BACKGROUND OF THE INVENTION

1. Field of the Invention

The disclosure relates generally to RAID (Redundant Arrays of Independent Disks) systems and setup methods thereof, and, more particularly to systems and setup methods thereof that integrate several RAID 0 architectures.

2. Description of the Related Art

Employment of disk arrays can improve access speed to disks and prevent data lost due to disk failure. Disk arrays integrate several disks into an array, used as a single disk. Data in a disk array is stripped and stored in different disks. During data access, related disks in the disk array can work simultaneously, reducing the data access time.

Figure 1:
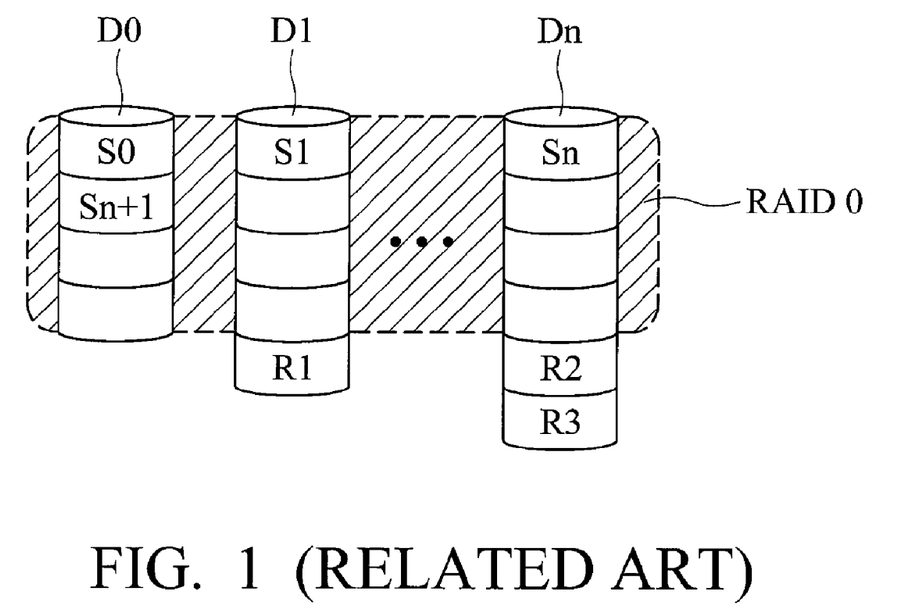
FIG. 1 is a schematic diagram illustrating a conventional RAID 0 architecture.

The technique for disk array is referred to as RAID, and configured in levels RAID 0 to RAID 5. In RAID 0 architecture, since data is stripped and stored in different disks, and respective disks can work independently, data can be simultaneously read/written on different disks, improving the data access efficiency. FIG. 1 is a schematic diagram illustrating a conventional RAID 0 architecture. As shown in FIG. 1, disks D0, D1, . . . , Dn are selected as a group to create a RAID 0 architecture, in which data strips S0, S1, . . . , Sn+1 are stored in different disks. It is understood that a strip size parameter must be configured during the creation of RAID 0 architecture, and data is stripped and stored in different disks accordingly.

Generally, an enterprise extends a storage system according to its own requirement. With advances in manufacturing technology and process, disk capacity has grown. Several disks having different sizes may be utilized in an enterprise. In conventional disk array technology, however, only a single RAID level can be applied, such that the capacity of each disk cannot be fully utilized. In FIG. 1, since disks D0, D1, . . . ,Dn are selected to create a RAID 0 architecture, and disk D0 has minimum disk capacity, the disk capacity of disk D0 size in respective disks is selected to create the RAID 0 architecture. As shown in FIG. 1, since the disk size of respective disks are different, the remnant disk capacity R1 in disk D1 and remnant disk capacity R2 and R3 in disk Dn cannot be fully utilized.

BRIEF SUMMARY OF THE INVENTION

RAID systems and setup methods thereof are provided.

An embodiment of a RAID system comprises a plurality of disks. At least a first group of disks is selected to create a RAID 0 architecture. A second group of disks is further selected to create the RAID 0 architecture. The RAID 0 architectures are concatenated.

In an embodiment of a RAID setup method, at least a first group of disks is first selected, and a RAID 0 architecture is created accordingly. A second group of disks is then selected, and another RAID 0 architecture is created accordingly. The RAID 0 architectures are concatenated.

Setup methods of the RAID systems may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

RAID systems and setup methods thereof are provided.

Figure 2:
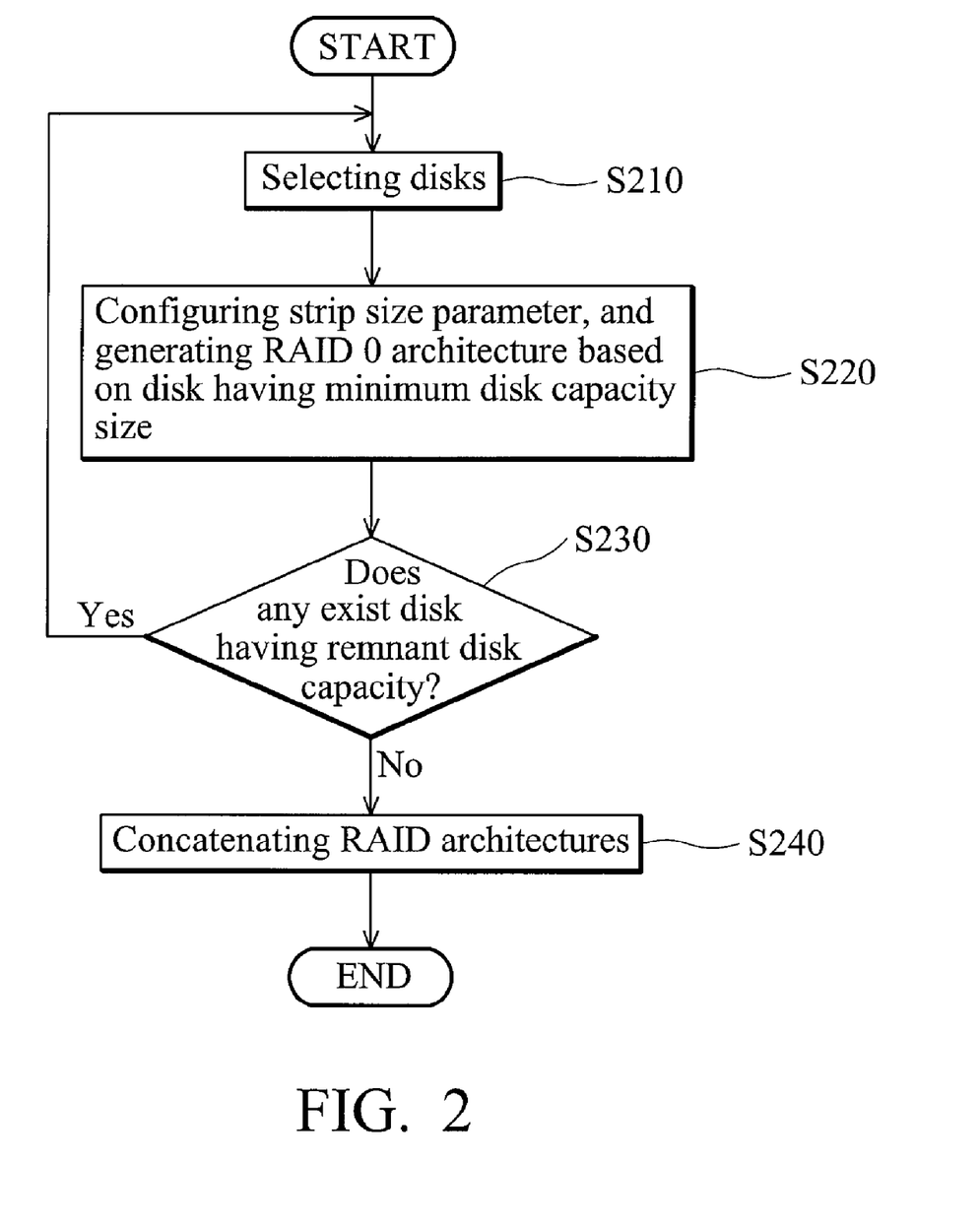
FIG. 2 is a flowchart showing a first embodiment of a RAID setup method.

FIG. 2 is a flowchart showing a first embodiment of a RAID setup method. It is noted that a plurality of disks, each having corresponding disk capacity size, are provided for disk array creation in this embodiment.

In step S210, a number of disks are selected from the disks. The selected disks are prepared to create a RAID 0 architecture. In some embodiments, the selected disks may be all the disks. In step S220, a strip size parameter is configured, and a RAID 0 architecture is created based on the disk having minimum disk capacity size among the selected disks. Since data is stripped and stored in different disks, a strip size parameter must be configured during the creation of RAID 0 architecture, and data is stripped and stored in different disks accordingly. It is understood that since RAID 0 architecture is known as industry standard, the creation thereof is omitted herefrom.

In step S230, it is determined whether any disk having remnant disk capacity exists. It is understood that each selected disk must provide a disk capacity with the minimum disk capacity size to create the RAID 0 architecture. Since respective disks may have different disk capacity size, some disks may have remnant disk capacity. If so, the procedure goes to step S210, the disks having remnant disk capacity are selected, and in step S220, a strip size parameter is configured, and a RAID 0 architecture is created based on the disk having minimum disk capacity size among the selected disks. If not, in step S240, the RAID 0 architectures are concatenated. It is understood that, in this embodiment, the RAID 0 architectures are concatenated using JBOD (Just a Bunch Of Disks) technique. JBOD is well-known and omitted herefrom.

Figure 3:
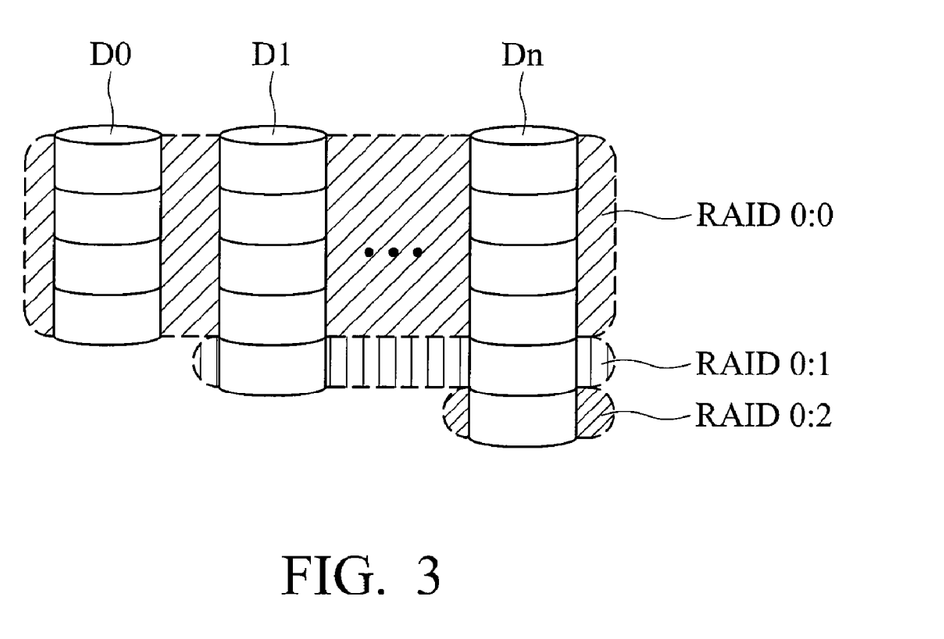
FIG. 3 is a schematic diagram illustrating a first embodiment of a RAID system.

FIG. 3 is a schematic diagram illustrating a first embodiment of a RAID system. As shown in FIG. 3, disks D0, D1, . . . ,Dn are first selected to create a RAID 0 architecture, named RAID 0:0. Since disks D1~Dn having remnant disk capacity exist, disks D1~Dn are selected to create a RAID 0 architecture, named RAID 0:1. Since disk Dn still has remnant disk capacity, disk Dn is selected to create a RAID 0 architecture, named RAID 0:2. The RAID 0:0, RAID 0:1 and RAID 0:2 are concatenated as a disk array using JBOD technique. It is understood that once the disk array is created, a RAID controller (not show) can perform related access control operations according to the RAID 0 architecture that data belonged in or required to write to. The data access control in RAID 0 architecture is well-known and omitted herefrom.

Figure 4:
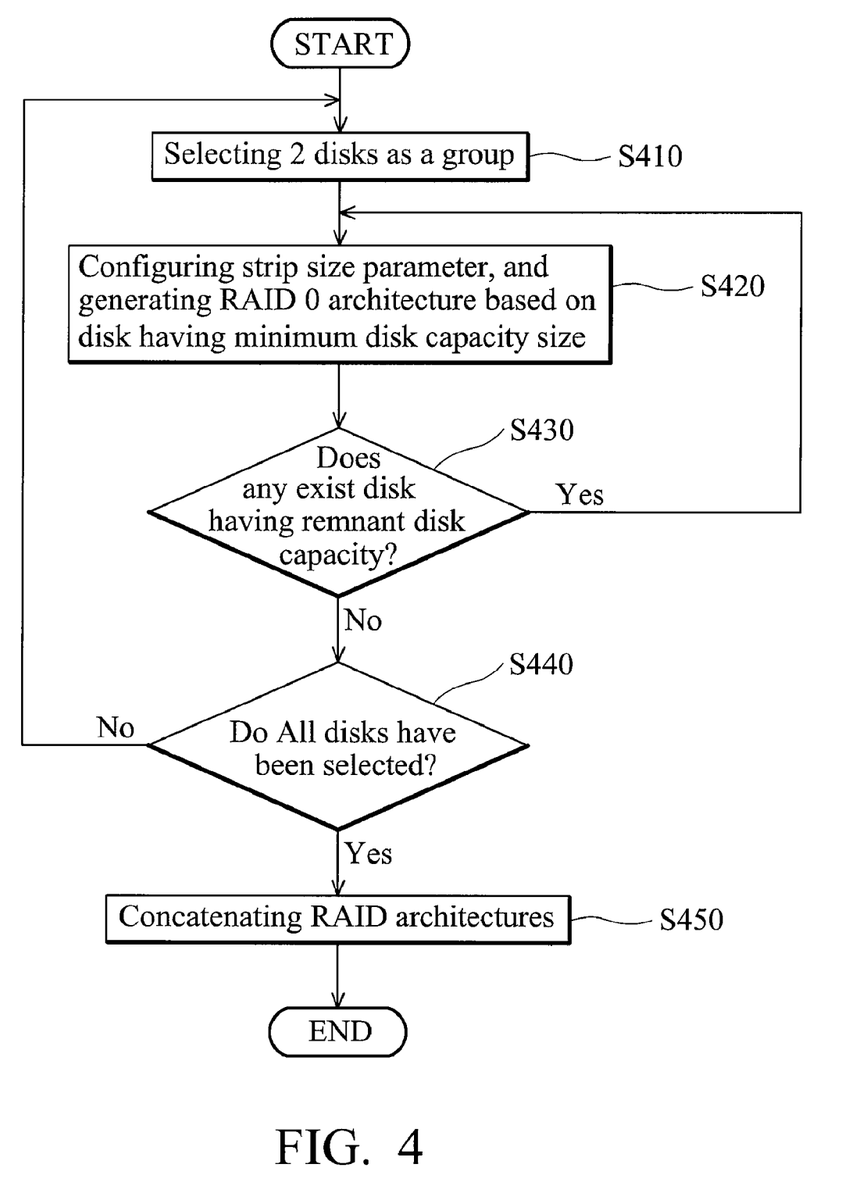
FIG. 4 is a flowchart showing a second embodiment of a RAID setup method.

FIG. 4 is a flowchart showing a second embodiment of a RAID setup method. In this embodiment, the number of disks is even.

In step S410, two disks are selected as a group. In step S420, a strip size parameter is configured, and a RAID 0 architecture is created based on the disk having minimum disk capacity size among the group. In step S430, it is determined whether any disk having remnant disk capacity exists. If so, the procedure goes to step S420, the disk having remnant disk capacity is selected to create a RAID 0 architecture. If not, in step S440, it is determined whether all disks have been selected. If not, the procedure goes to step S410. If so, in step S450, the RAID 0 architectures are concatenated.

Figure 5:
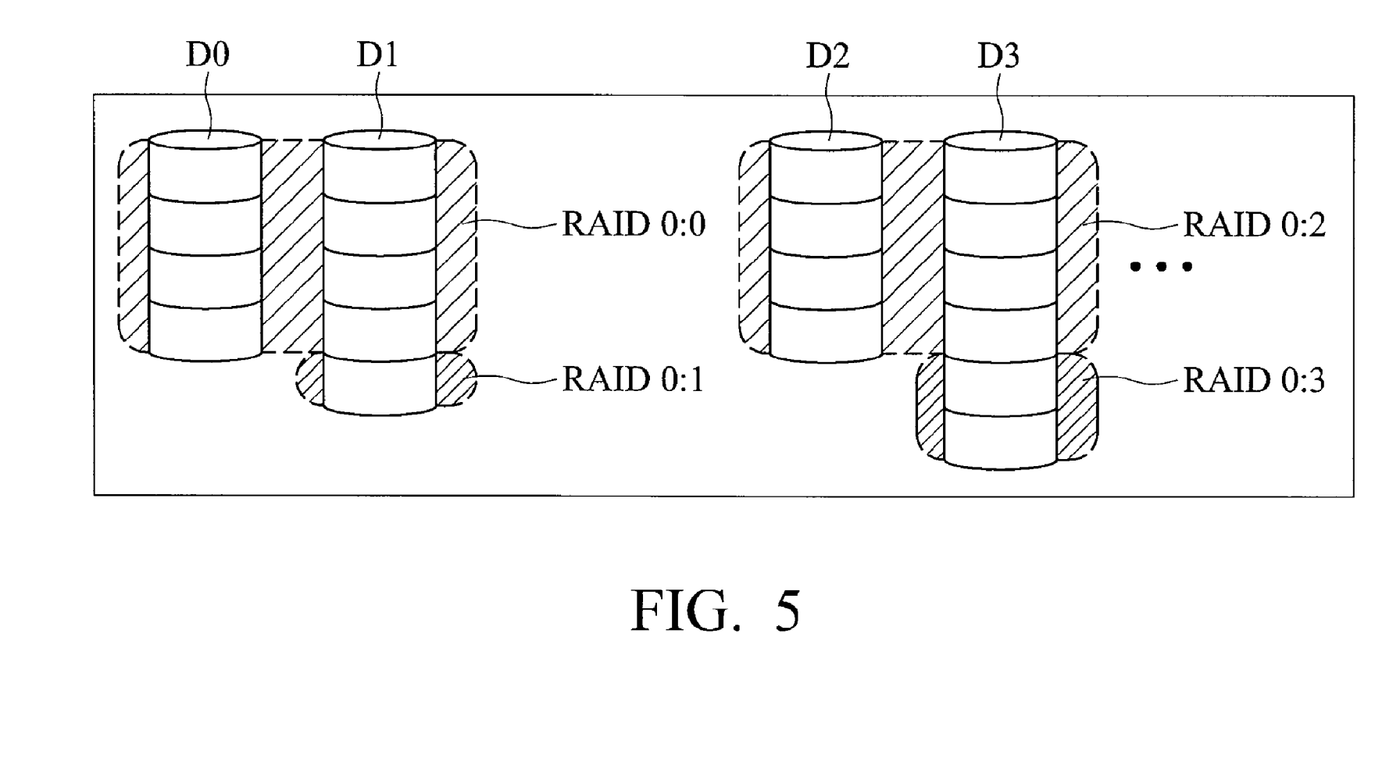
FIG. 5 is a schematic diagram illustrating a second embodiment of a RAID system.

FIG. 5 is a schematic diagram illustrating a second embodiment of a RAID system. As shown in FIG. 5, disks D0 and D1 are selected as a group to create a RAID 0 architecture, named RAID 0:0. Since disk D1 has remnant disk capacity, disk D1 is selected to create a RAID 0 architecture, named RAID 0:1. Then, disks D2 and D3 are selected as a group to create a RAID 0 architecture, named RAID 0:2. Since disk D3 has remnant disk capacity, disk D3 is selected to create a RAID 0 architecture, named RAID 0:3. Similarly, other disks undergo the same creation procedure until all disks have been selected. Finally, the RAID 0:0, RAID 0:1, RAID 0:2, RAID 0:3 and other RAID 0 architectures are concatenated as a disk array.

Figure 6:
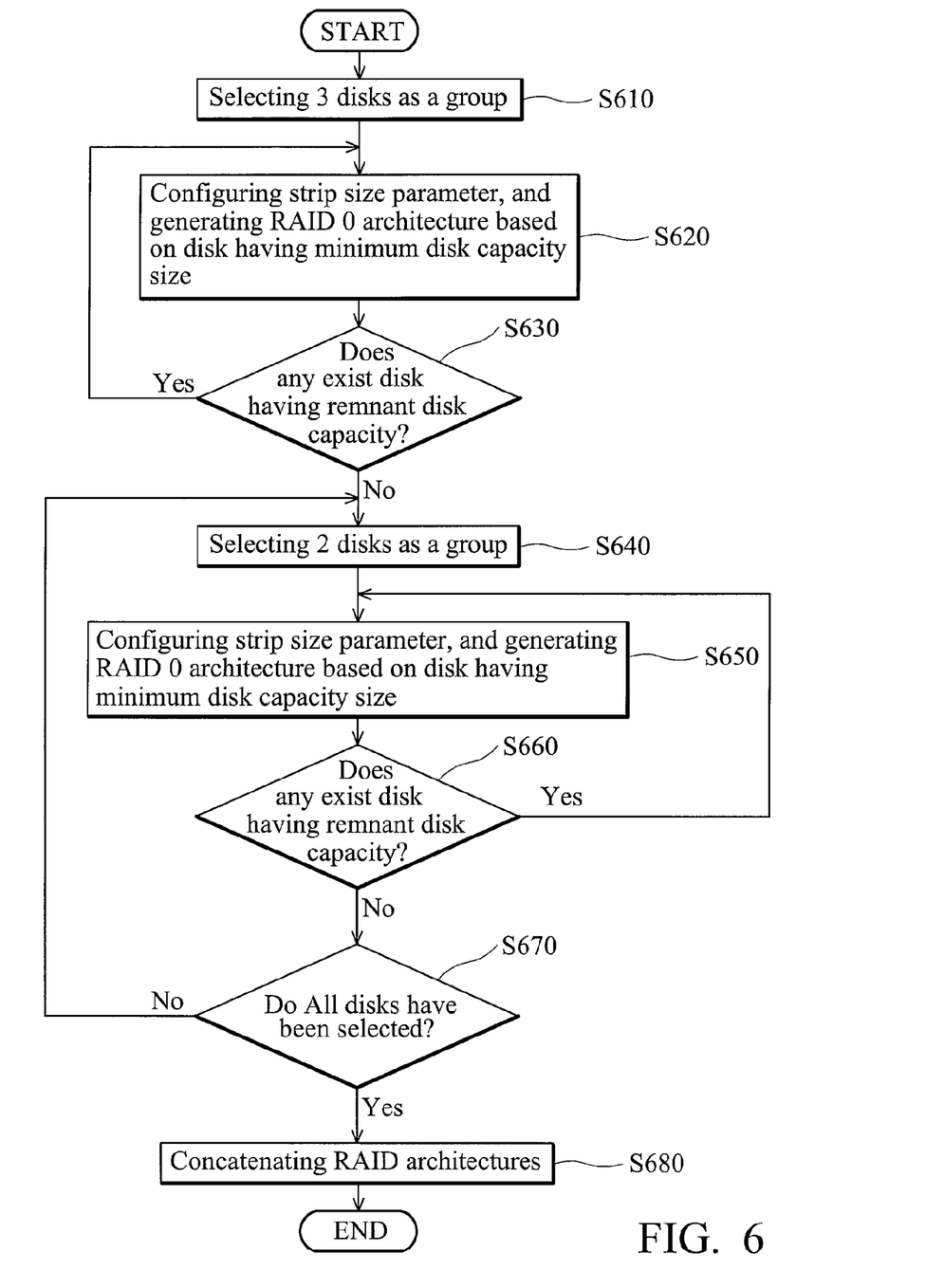
FIG. 6 is a flowchart showing a third embodiment of a RAID setup method.

FIG. 6 is a flowchart showing a third embodiment of a RAID setup method. In this embodiment, the number of disks is odd.

In step S610, three disks are selected as a group. In step S620, a strip size parameter is configured, and a RAID 0 architecture is created based on the disk having minimum disk capacity size among the group. In step S630, it is determined whether any disk having remnant disk capacity exists. If so, the procedure goes to step S620, in which disks having remnant disk capacity are selected to create a RAID 0 architecture until no disk having remnant disk capacity exists. If not, in step S640, two disks are selected as a group. In step S650, a strip size parameter is configured, and a RAID 0 architecture is created based on the disk having minimum disk capacity size among the group. In step S660, it is determined whether any disk having remnant disk capacity exists. If so, the procedure goes to step S650, in which disk having remnant disk capacity is selected to create a RAID 0 architecture. If not, in step S670, it is determined whether all disks have been selected. If not, the procedure goes to step S640. If so, in step S680, the RAID 0 architectures are concatenated.

Figure 7:
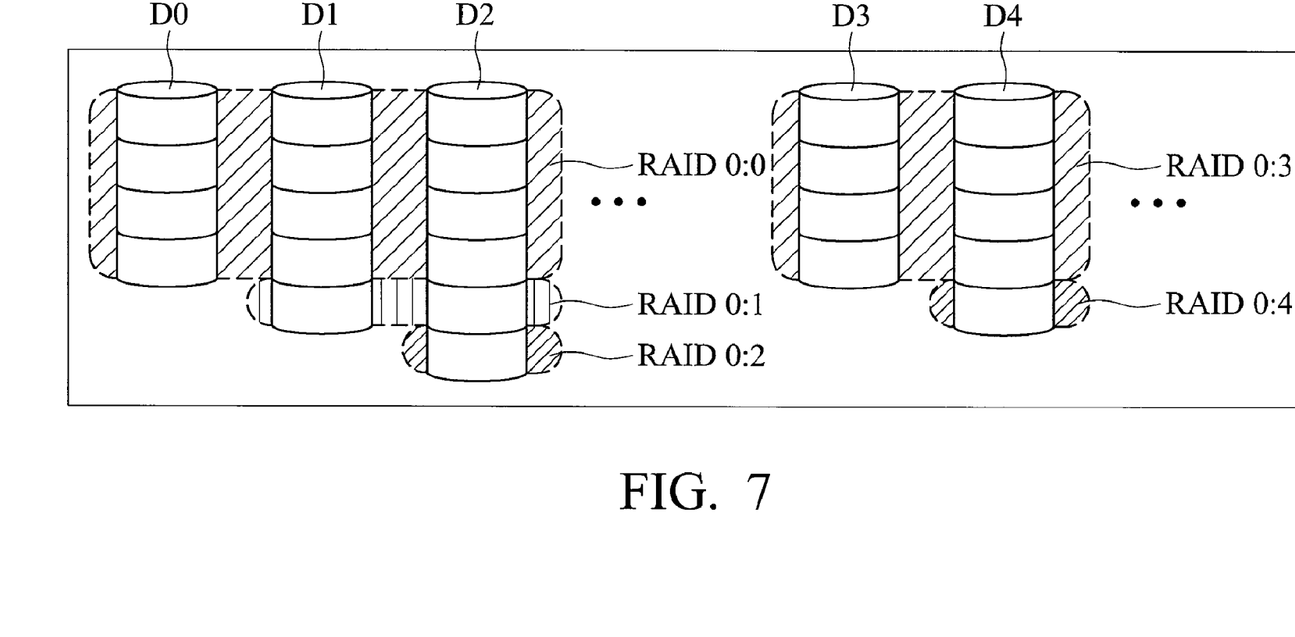
FIG. 7 is a schematic diagram illustrating a third embodiment of a RAID system.

FIG. 7 is a schematic diagram illustrating a third embodiment of a RAID system. As shown in FIG. 7, disks D0, D1 and D2 are selected as a group to create a RAID 0 architecture, named RAID 0:0. Since disks D1 and D2 have remnant disk capacity, disks D1 and D2 are selected to create a RAID 0 architecture, named RAID 0:1. Disk D2 still has remnant disk capacity, and is selected to create a RAID 0 architecture, named RAID 0:2. Then, other disks undergo the creation procedure in the second embodiment (as shown in FIG. 5) until all disks have been selected. As shown FIG. 7, disks D3 and D4 are selected as a group to create a RAID 0 architecture, named RAID 0:3. Since disk D4 has remnant disk capacity, disk D4 is selected to create a RAID 0 architecture, named RAID 0:4. Finally, the RAID 0 architectures are concatenated as a disk array.

RAID systems and setup methods thereof, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereof. Those who are skilled in this technology can still make various alterations and modifications without departing from the scope and spirit of this invention. Therefore, the scope of the present invention shall be defined and protected by the following claims and their equivalents.

What is claimed is:

1. A RAID system, comprising:
a plurality of disks;
wherein at least a first group of the disks is selected to create a RAID 0 architecture, a second group of the disks is selected to create a RAID 0 architecture, and the RAID 0 architectures are concatenated, wherein the second group is within the first group, and the disks of the second group are the disks having remnant disk capacity after the RAID 0 architecture of the first group is created, and wherein the RAID 0 architectures corresponding to the first and second group are created respectively based on the disk having minimum disk capacity size among the disks of the first and second group.

2. The system of claim 1 wherein the first group comprises all the disks.

3. The system of claim 1 wherein the number of the disks in the first group is 2 or 3.

4. The system of claim 3 wherein a third group of the disks is selected to create a RAID 0 architecture, a fourth group of the disks is selected to create a RAID 0 architecture, and all the RAID 0 architectures are concatenated; wherein the fourth group is within the third group, and the disks of the fourth group are the disks having remnant disk capacity after the RAID 0 architecture of the third group is created, and the disks of the third group and the disks of the first group do not overlap.

5. The system of claim 4 wherein the number of the disks in the third group is 2.

6. The system of claim 1 wherein the RAID 0 architecture corresponding to the first group comprises a strip size parameter, and data is stripped and stored in the disks of the first group accordingly.

7. The system of claim 1 wherein the RAID 0 architectures are concatenated using JBOD (Just a Bunch Of Disks) technique.

8. A RAID setup method for use in a plurality of disks, comprising:

selecting a first group of the disks to create a RAID 0 architecture;

selecting a second group of the disks from the first group to create a RAID 0 architecture; and concatenating the RAID 0 architectures, wherein the disks of the second group are the disks having remnant disk capacity after the RAID 0 architecture of the first group is created, and wherein the RAID 0 architectures corresponding to the first and second group are created respectively based on the disk having minimum disk capacity size among the disks of the first and second group.

9. The method of claim 8 further comprising selecting all the disks as the first group.

10. The method of claim 8 further comprising selecting 2 or 3 disks into the first group.

11. The method of claim 10 further comprising selecting a third group of the disks to create a RAID 0 architecture; selecting a fourth group of the disks from the third group to create a RAID 0 architecture; and concatenating all the RAID 0 architectures, wherein the disks of the fourth group are the disks having remnant disk capacity after the RAID 0 architecture of the third group is created, and the disks of the third group and the disks of the first group do not overlap.

12. The method of claim 11 wherein the number of the disks in the third group is 2.

13. The method of claim 8 further comprising configuring a strip size parameter for the RAID 0 architecture corresponding to the first group, wherein data is stripped and stored in the disks of the first group accordingly.

14. The method of claim 8 further comprising concatenating the RAID 0 architectures using JBOD (Just a Bunch Of Disks) technique.

* * * * *